US007926171B2

(12) United States Patent
Perera et al.

(10) Patent No.: US 7,926,171 B2
(45) Date of Patent: Apr. 19, 2011

(54) APPARATUS FOR MANUFACTURE OF AN INSULATED MICROWIRE

(75) Inventors: Willorage Rathna Perera, Raynham, MA (US); Gerald J. Mauretti, Fall River, MA (US)

(73) Assignee: Pascale Industries, Inc., Pine Bluff, AR (US)

( * ) Notice: Subject to any disclaimer, the term of this patent is extended or adjusted under 35 U.S.C. 154(b) by 59 days.

(21) Appl. No.: 12/384,466

(22) Filed: Apr. 6, 2009

(65) Prior Publication Data

US 2009/0260848 A1 Oct. 22, 2009

Related U.S. Application Data

(63) Continuation-in-part of application No. 11/976,196, filed on Oct. 22, 2007, now Pat. No. 7,832,089.

(60) Provisional application No. 60/861,951, filed on Dec. 1, 2006.

(51) Int. Cl.
*B23P 19/00* (2006.01)

(52) U.S. Cl. ..................... 29/745; 264/167; 264/171.12; 264/171.13; 264/171.15; 428/373

(58) Field of Classification Search .................... 29/745; 264/167, 171.12, 171.13, 171.15; 428/373
See application file for complete search history.

(56) References Cited

U.S. PATENT DOCUMENTS

| | | | | |
|---|---|---|---|---|
| 867,659 | A * | 10/1907 | Hoopes et al. | 428/592 |
| 3,561,399 | A * | 2/1971 | Federman | 118/65 |
| 5,173,366 | A | 12/1992 | Mitamura et al. | |
| 5,814,122 | A | 9/1998 | Huang | |
| 2004/0222010 | A1 | 11/2004 | Tonucci | |

OTHER PUBLICATIONS

"Metal Fibers", NERAC search report prepared by J. Brule dated May 30, 2006.
"Electrotextiles", NERAC search report prepared by J. Brule dated May 16, 2006.

* cited by examiner

*Primary Examiner* — C. J Arbes
(74) *Attorney, Agent, or Firm* — Michael de Angeli

(57) ABSTRACT

Insulated electrically conductive continuous fibers or microwires of sizes on the order of 1 mil (25 microns) diameter, so as to be suitable for processing into yarns or multi-microwire bundles, for example, for incorporation into conformable fabric products or for use as wearable electronic circuitry are made by coprocessing a core of a lower-melting-point metal within a sheath of a higher-melting-point polymer.

14 Claims, 5 Drawing Sheets

FIG. 7(b)
FIG. 7(a)
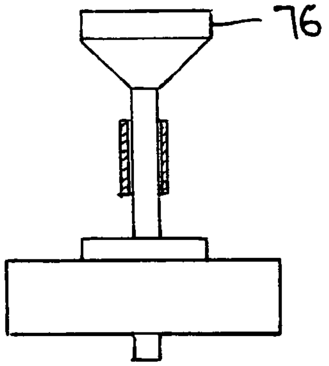
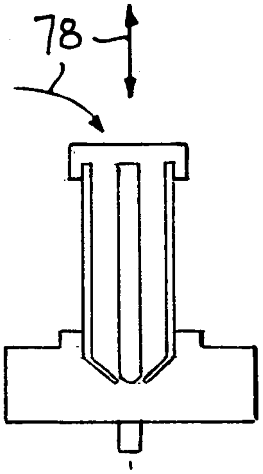
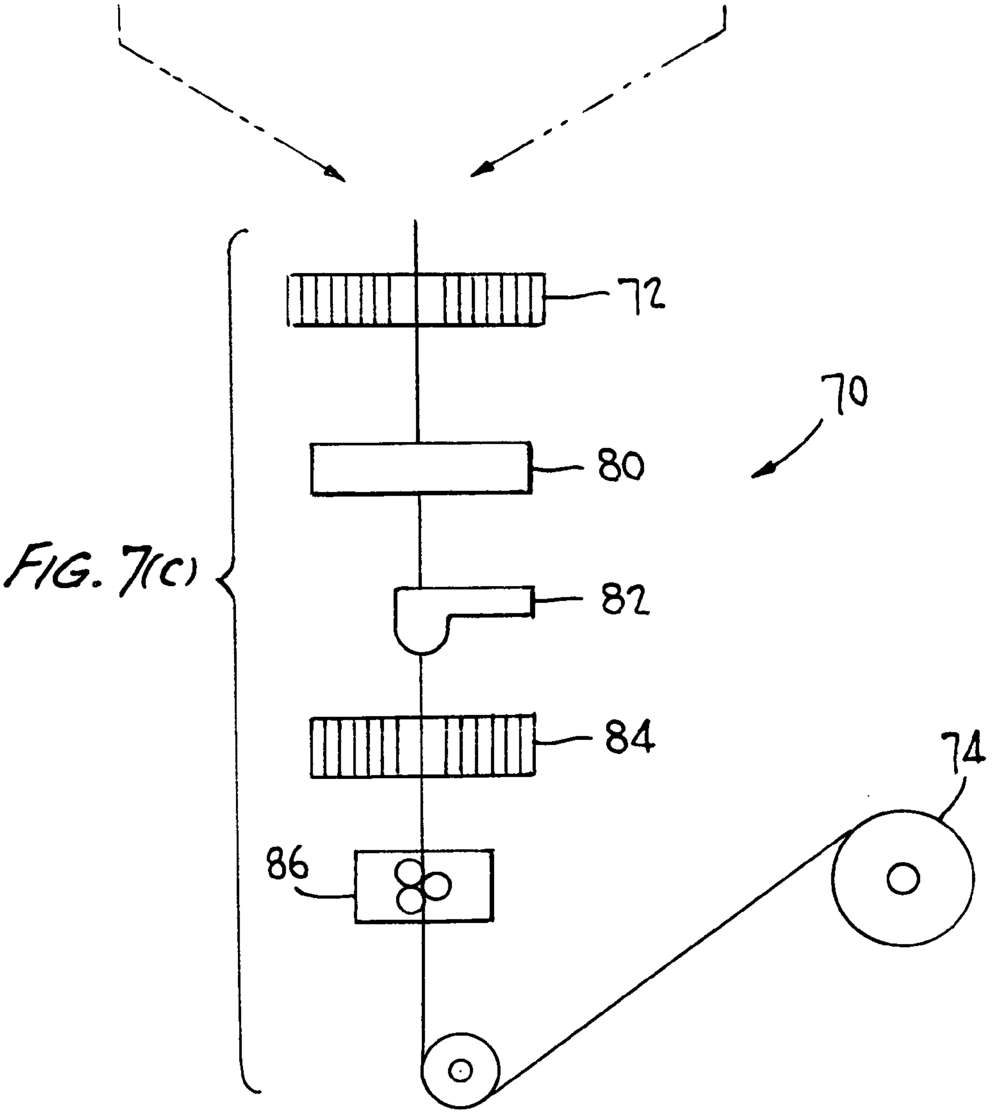
FIG. 7(c)

APPARATUS FOR MANUFACTURE OF AN INSULATED MICROWIRE

CROSS-REFERENCE TO RELATED APPLICATION

This application is a continuation-in-part of Ser. No. 11/976,196, filed Oct. 22, 2007 now U.S. Pat. No. 7,832,089. Ser. No. 11/976,196 claimed priority from provisional patent application Ser. No. 60/861,951, filed Dec. 1, 2006. This application incorporates by this reference Engineered Yarns Company's SBIR Proposal Number A062-175-0107 (the "Proposal"), a copy of which was filed together with provisional application Ser. No. 60/861,951, as well as the Phase I Final Report prepared for that Proposal dated 5 May 2007 (the "Final Report").

FIELD OF THE INVENTION

This invention relates to novel highly electrically conductive fibers or "microwires", comprising a conductive core and an insulating sheath, that are sufficiently small and flexible as to be capable of being processed to form textile threads or yarns, which can in turn be woven, knitted, braided or otherwise processed, for example to produce fabrics used to fabricate various useful products. The invention also relates to several different methods of making these fibers, and to various classes of products that can be made using these products.

BACKGROUND OF THE INVENTION

The prior art has sought for many years to incorporate electrically conductive fibers or threads into fabric, for various desired applications, both military and commercial. What is essentially desired is an insulated, electrically conductive fiber or "microwire" of between 0.0004-0.004 inches, that is, 10-100 microns, in diameter. Ideally the diameter of the microwires would be less than 25 microns, that is, no greater than 0.001 inches. Further desired characteristics are that the resistance of the conductive component of the fiber per unit length be no more than about five times that of copper, to ensure adequate electrical performance, that the diameter of the central conductor be about 60% of the overall fiber diameter, and that the microwire is suitably flexible to be processed into a wearable textile product and sufficiently durable to withstand ordinary use in a garment. Such microwires are contemplated for carrying heating current, carrying data, for providing electromagnetic shielding, for antenna and sensor fabrication, for connection of electronic components secured to the fabric of a garment, and for other uses.

Mitamura et al U.S. Pat. No. 5,173,366 shows apparatus and methods for manufacture of fine conductive fibers, that is, less that 50 microns in overall diameter. These are made by coprocessing a low-melting point conductive metal core in a sheath of a higher-melting point polymer, which is also a feature of the present invention. However, Mitamura does not suggest that the fibers formed according to the teachings of the patent would be suitable as conductors, but acknowledges that the conductive core fibers have significant discontinuity of 5 cm or less per meter. These discontinuities greatly limit the utility of the Mitamura fibers. Moreover, the specific resistance of the Mitamura fiber is "about $10^4$ Ω-cm" (col. 3, line 60); this is far too high for many purposes.

It is accordingly an object of the invention to provide extremely fine microwires, that is, wires comprising a conductive core and an insulative sheath, in which the conductors are continuous and their conductivity is sufficiently high that the microwires are suitable for service as conductors in electronic circuits.

SUMMARY OF THE INVENTION

Two closely related methods of production of "microwires", that is, electrically conductive, insulated fibers as above, are disclosed herein. As noted, the invention also includes the fibers so produced, as well as thread or yarn made from them and all manner of products produced therefrom.

In both methods of production of fibers according to the invention, a lower-melting-point, highly conductive metal central member is co-processed together with a polymeric sheath of a higher-melting-point material to form long lengths of fine insulated wire. That is, as opposed to more typical methods of making insulated wire, wherein a solid metallic conductor or multifilamentary strand is first drawn to size and subsequently insulated by formation of a polymeric insulative sheath thereover, e.g., by extrusion, according to the present invention the metallic conductor and insulative sheath are produced in a single common operation. In effect, the metal of the core is melted while being confined within the polymeric sheath, which is softened sufficiently to permit drawing, so that capillary action within the sheath as the core and sheath materials are codrawn causes the metallic core to form an elongated continuous conductive member insulated by the sheath.

More specifically, and as discussed more fully below and in the Final Report, metals suitable for practice of the invention include indium, indium alloys such as indium/silver and other low melting point, highly conductive metal alloys such as tin/silver/copper or tin/lead. Suitable polymers include Bayer Macrolon 3103 or 6457 polycarbonate or Eastman Chemical Eastar Copolyester (PETG) GN007, as well as other polymers having similar rheologies. These polymers melt and draw well at temperatures of about 500° F. and higher, while indium and the other alloys mentioned melt at considerably lower temperatures; for example, pure indium melts at 314° F.

A first method of producing fibers according to the invention is referred to as the "preform" or "rod-in-tube" method. In laboratory-scale testing of this technique, a cylindrical "preform" was first fabricated comprising a core of, e.g., indium, on the order of 30 mils (0.030", (approximately 750 microns, or 0.75 mm) in diameter disposed in a cylindrical tube of the desired polymer so as to provide a 0.080-0.120" (2-3 mm) layer of the outer polymer over the metallic core. The preform was placed in a tube furnace and heated; a fine bicomponent insulated wire could be drawn from the tip of the preform, out the exit of the tube furnace.

It is envisioned that a plurality of metal core wires could be disposed in a single polymer tube and the whole codrawn, to further control the ratio of metal to polymer in the final product. In a further alternative, multiple preforms, each containing a conductive core in a tube of insulating polymer, might be placed in the tube furnace and similarly co-processed, to yield a single strand containing multiple conductive wires in an integrated insulative sheath.

A second related method of producing fibers according to the invention is referred to as the "double-crucible" method. The metal intended to form the conductive core of the microwire is melted in an inner crucible surrounded by a coaxial outer crucible containing the polymeric material intended to form the insulative sheath. The coaxial crucibles are oriented vertically, with their exit orifices at the lower ends, so that gravity aids in urging the respective molten or semi-molten materials through coaxial exit orifices formed by the crucible tips. Pressure or vacuum may be applied to either or both of the crucibles to aid in stable formation of the conductor and sheath, and the metal and polymer may be heated together or separately, for better control. The sizes of the inner and outer crucible tips must be carefully selected, and their relative axial locations carefully controlled, to provide the appropriate product characteristics. The bicomponent fiber exiting the double crucible may be drawn further to reduce its overall diameter.

Both approaches have their advantages. As will be explained more fully below, the rod-in-tube method has the advantage that a very precise relationship between the diameter of the core wire and the thickness of the insulation can be maintained. In addition, fibers having a desired cross-sectional shape might be made by starting with a preform of the desired shape; for example, a hexagonal preform could be used to make micro-wires that are hexagonal in section, which could then be compacted into tight bundles, so as to form a multi-wire yarn. However, indium wire of a size suitable as the core of the preform is priced at approximately $11,000 per pound. By comparison, indium metal in ingot form, as is suitable for the double crucible method, is priced at only about $650 per pound, resulting in a very significant saving. As of the filing of the parent application, both the rod-in-tube and double-crucible methods had been tested to the point of proof-of-concept.

According to the present continuation-in-part application, additional information is provided concerning the preferred embodiment of the double-crucible method of the invention, and as to the preferred materials and processing conditions for practice of the invention.

Other aspects and advantages of the invention will appear as the discussion below proceeds.

BRIEF DESCRIPTION OF THE DRAWINGS

The invention will be better understood if reference is made to the accompanying drawings, in which:

FIG. 7, comprising FIGS. 7 (*a*)-(*c*), shows schematically a tower arrangement for mass production of filaments according to the invention, with both the rod-in-tube and double-crucible alternatives being shown.

DESCRIPTION OF THE PREFERRED EMBODIMENTS

Figure 1:
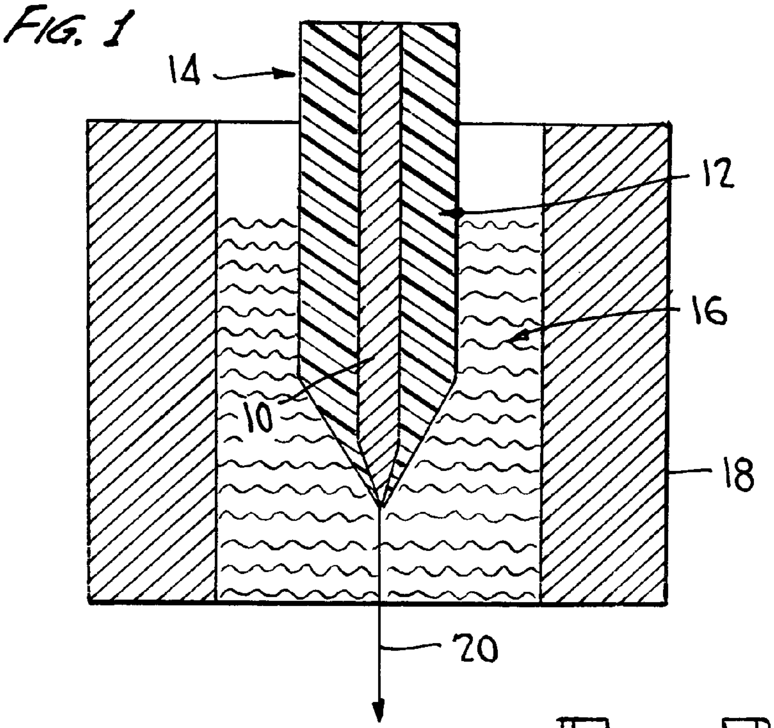
FIG. 1 shows schematically a cross-sectional view of apparatus for producing a filament comprising a codrawn metallic core and polymeric sheath from a rod-in-tube preform.

Conceptually, and as shown in FIG. 1, the method of the invention for producing microwires, that is, fine fibers comprising a metallic core in an insulative sheath, is not overly complex, although it goes contrary to the common practice of hundreds of years and doubtless thousands of man-hours expended in optimizing methods of manufacture of insulated electrical wire. That is, insulated wire has been conventionally made by forming a metallic wire or filaments to a desired degree of fineness, optionally making a wire yarn of a number of individual filaments if a stranded wire is desired, and separately insulating the conductor, typically by extruding a polymeric coating over the previously formed metallic conductor or yarn. The only exception to the foregoing known to the inventors is the Mitamura U.S. Pat. No. 5,173,366, which does teach simultaneous formation of the conductor and its insulating sheath. However, as noted above, Mitamura's fibers were admittedly unsatisfactory for use as conductors in a circuit.

According to the present invention, the metallic conductor is formed simultaneously with the insulative sheath; the polymeric sheath essentially forms the "die" in which a continuous filament is formed of the molten metallic conductor material as the polymer and metal are codrawn from either a rod-in-tube precursor or employing the double-crucible arrangement. Indeed, there may be other ways of forming ultrafine insulated microwires by simultaneously coprocessing a low-melting-point metal within a higher-melting-point polymer sheath; these additional methods are also to be considered within the invention where not specifically excluded by the claims hereof.

Thus, as illustrated in FIG. 1, according to the invention a rod 10 of a relatively lower melting point metallic material of good electrical conductivity, and additionally exhibiting good solderability, high fatigue resistance, and substantial flexibility is disposed in a tube 12 of a relatively higher melting point polymeric material. This "preform" 14 is then exposed to heat, as indicated at 16, from a tube furnace 18 or other source. When the components of the preform 14 are properly heated, it is possible to simply grasp the tip of the preform and draw off a thin filament 20 comprising a metallic core in a polymeric sheath or "clad". The thin filament 20 thus formed can then be led over rollers, through inspection devices, and onto a take-up spool, all as discussed below in connection with FIG. 7.

Typically, the preform will be 0.200-0.375" in diameter; the filament 20 is drawn from the preform at an initial diameter, for example 0.010-0.030", and is drawn down to a final diameter, e.g., 0.0004-0.004" as it is elongated by the take-up spool and related equipment, while the relative proportions of the metallic conductor and insulative sheath remain constant. Thus, starting with a initial filament of a given diameter being drawn from the preform, the degree of elongation of the initial filament and thus the eventual diameter of the filament 20 can be controlled by the speed at which the elongated filament is wound on a spool. As will be apparent to those of skill in the art, most if not all of the elongation takes place in the first few inches of movement of the filament from the preform, while the metal core and polymer sheath remain relatively hot.

As noted above, it is within the scope of the invention to use a preform of a desired cross-sectional shape to form filaments of the same shape. For example, a cylindrical metal rod disposed in a cylindrical bore in a polymer casing of hexagonal external shape can be drawn to form a filament of hexagonal cross-section; a large number of such filaments can be packed more efficiently than round-sectioned filaments, which might be of use in manufacture of yarns comprising many microwire filaments. Further, a large number of such hexagonal-section microwires could be bundled together, perhaps in a polymer can, and further codrawn, to form even finer conductive filaments in a polymer matrix.

It will be apparent to those of skill in the art that proper control of the relative temperatures of the metallic core and the polymeric sheath materials is important to successful practice of the invention. In the FIG. 1 embodiment, which was used in initial testing of the invention, as described in detail in the Final Report, the tube furnace 18 comprised a metal tube heated by two 400-watt band heaters; this was satisfactory for heating an "Indalloy" indium alloy (detailed further below) rod 0.030" in diameter and one inch long, disposed in a 0.032" central hole formed in a polymer rod 0.34" in diameter. In this arrangement, as both the metallic rod and the polymer sheath material are heated by the same source, independent control of their heating is not possible. This was satisfactory for the proof-of-concept work done prior to filing of the parent application, but is unlikely to suffice for large-scale production operations.

More specifically, in testing of the "rod-in-tube" or "preform" method of practice of the invention, preforms were heated in a vertical tube furnace as described above, followed by hand drawing of the filament. The polymers used in these tests melted at approximately 525° F., and the metals at approximately 244-460° F. Note that the polymers in use are amorphous polymers and thus exhibit a range of melt temperatures at which they can be softened and "pulled", rather than a specific temperature at which they change from a solid to a liquid. In the FIG. 1 arrangement, heat must be conducted from the tube furnace to the rod by the polymer to melt the metal. The fact that insulative polymers are usually if not uniformly also poor conductors of heat means that this is not the optimal method of heating the metallic rod. Due to the substantial difference in melting temperatures, even relatively inefficient transfer of heat from the polymer to the metal was sufficient to melt the metal. Obviously, the optimum implementation would allow melting of the metal without heating the polymer to a temperature where it loses its strength.

Still more specifically, if both the polymer and metal core are to be heated in a single step, the polymer temperature may need to be raised above its optimum temperature for processing in order to melt the metal. Polymer strength goes down as the temperature goes up, resulting in insufficient strength in the polymer to "pull" the metal; this in turn can lead to the necking problems described in detail in connection with FIG. 2 below, or other failure mechanisms that may result in discontinuity of the metal core within the polymer sheath. In addition, because overheated polymer stretches significantly more than metal, there is a danger that the metal will not flow at sufficient speed to keep up with the polymer, again resulting in sections of fiber that contain no metal.

Figure 2:
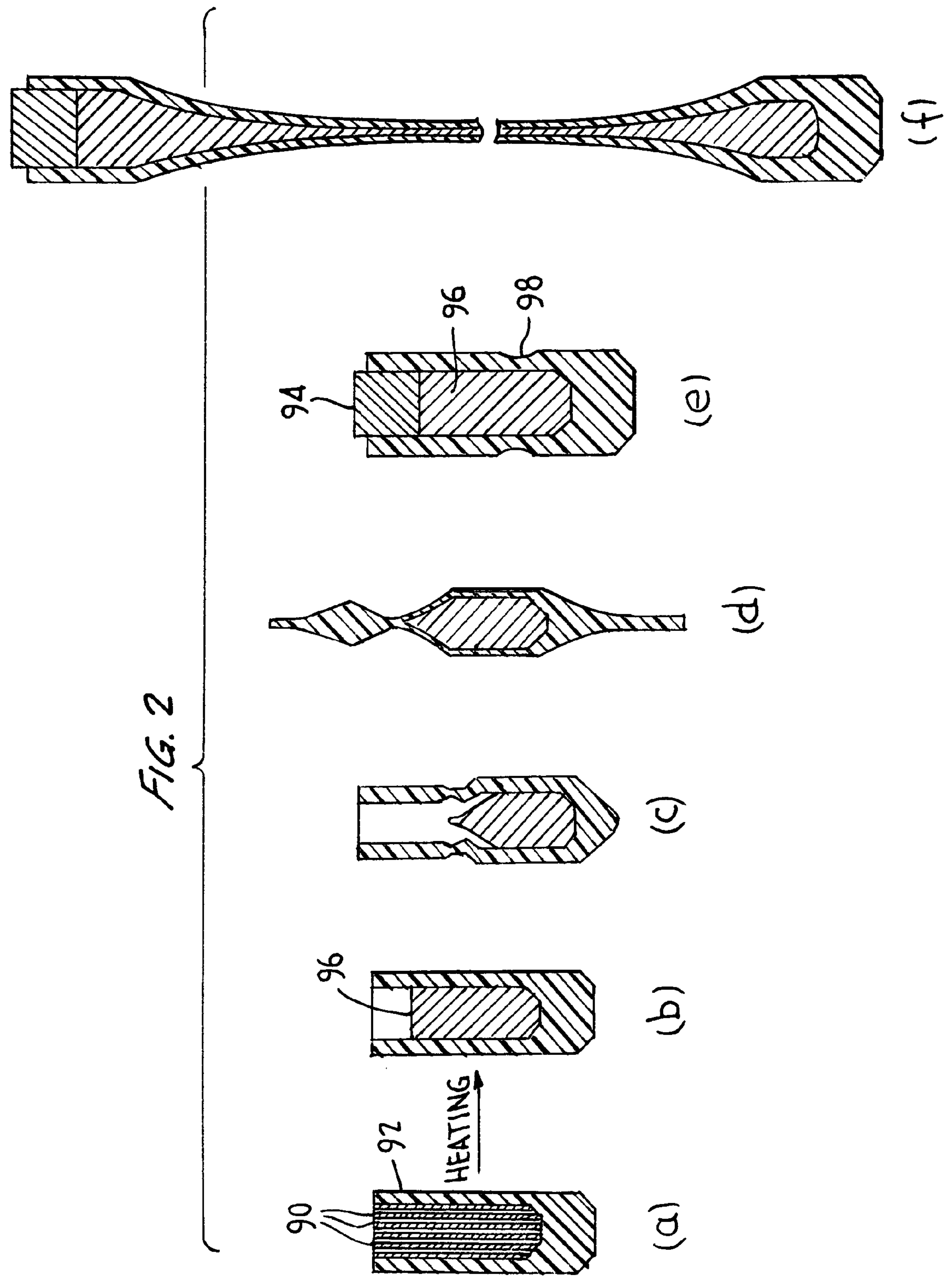
FIG. 2, comprising FIGS. 2 (*a*)-(*f*), depicts a "necking" problem that can occur when a relatively large-diameter metallic core is codrawn in a relatively thin-walled polymer shell, and illustrates one possible solution.

FIG. 2, comprising FIGS. 2(*a*)-(*f*), illustrates this necking problem and one possible solution. The necking problem was first encountered when an attempt was made to increase the ratio of core metal to polymer cladding by disposing 5 30-mil metal wires 90 in a closed-ended polymer tube 92 having a diameter of approximately 150 mils and a hole size of 96 mils, as illustrated in FIG. 2 (*a*). A first attempt to draw microwire from this preform was unsuccessful. Two conditions are believed to have contributed to this. When the center hole of the preform is relatively large (over 50% of its overall diameter), the polymer wall is relatively thin. When sufficient heat is applied to melt the metal wires, the polymer softens to the point that the thin wall becomes insufficiently strong to support the fiber drawing force. In addition, because there are spaces among the individual wires, when the metal is completely molten, as in FIG. 2(*b*), it does not fill the entire space occupied by the wires and a hollow preform section results. The hollow preform, having diminished wall strength because of thinness and heating, can easily form a "neck", as illustrated by FIG. 2(*c*), when drawing force is applied, and a failure of the tube wall can be initiated above the molten metal. When the polymer wall collapses, the metal is trapped below the necking point, but polymer without a metal core continues to be drawn from above the point at which the metal is trapped, resulting in the failure mode of the large-core preform shown in FIG. 2(*d*).

Two steps were taken to solve this problem, allowing microwire fiber to be successfully drawn. The first was to insert a solid metal bar 94 directly above the molten material 96, as shown in FIG. 2(*e*), plugging the open end of the bore in the polymer member, in order to support the weak area in which the necking occurred. However, because the metal bar 94 and the molten metal 96 were not actually attached, a weak spot still potentially existed in the juncture between the two. To address this, the polymer tube was notched, or "prenecked", by cutting a circumferential groove around the polymer tube, as shown at 98 in FIG. 2(*e*). Thus forming a weakened ring around the polymer tube insured that necking would occur in a controlled manner, that is, commencing in an area containing molten metal 96. With the preformed neck 98, drawing force applied to the lower end of the preform caused the preform to start to be drawn at the neck until it formed a fiber, as illustrated in FIG. 2(*f*). Because fiber was drawn commencing from a point on the polymer tube containing metal, the presence of metal in the drawn fiber was assured. These tests were successful in producing fiber with a high ratio of core to clad. Conductivity test results from microwires drawn in these tests are given in Table 6 of the Final Report.

Figure 3:
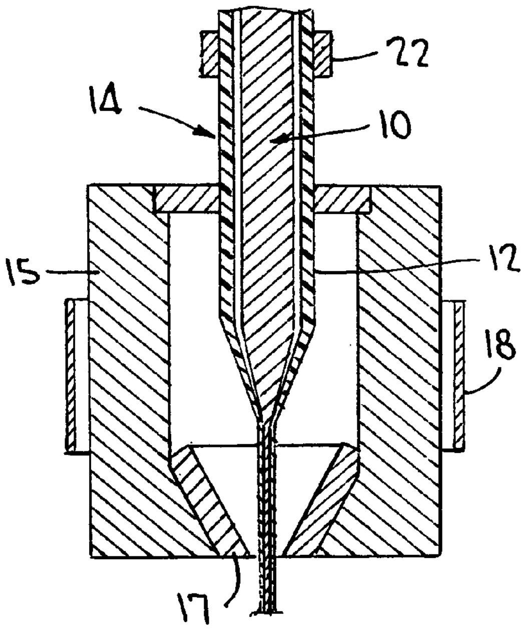
FIG. 3 shows a view similar to FIG. 1, illustrating one possible arrangement for separately heating the metal and polymer of the preform.
Figure 4:
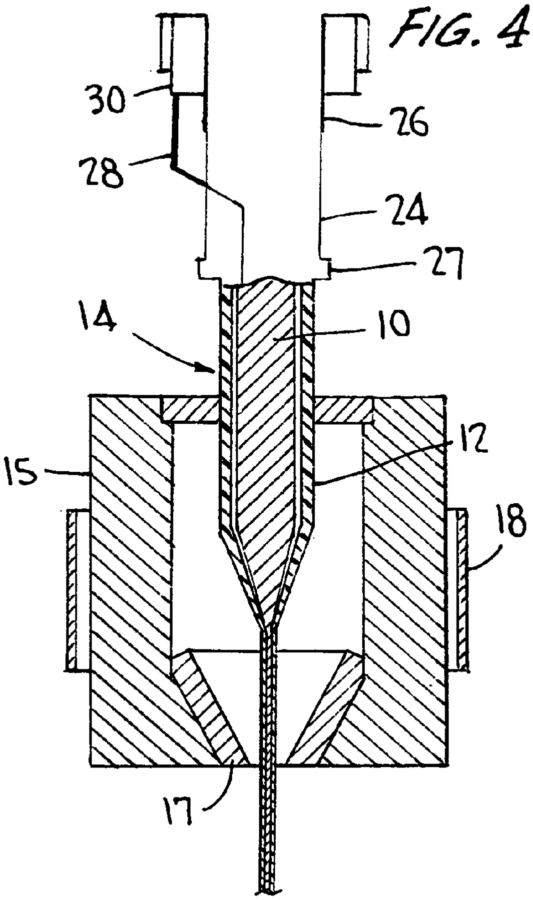
FIG. 4 shows a view similar to FIG. 3, illustrating a different heating arrangement.

It is anticipated that in the preferred practice of the invention the polymer and the metal will be heated by independently-controlled heating devices, so that each material can be heated to the optimum processing temperature, providing better temperature control and allowing optimization of the process. More specifically, FIGS. 3 and 4 show more sophisticated arrangements whereby the polymer and metal core can be heated separately, providing better control. In each, the preform 14 is disposed in an oven 15, and the polymer 12 can be melted, as in the FIG. 1 embodiment, by a vertical tube furnace 18. However, a separate heating device is added to separately heat the rod 10 of the metal intended to form the core. This can be done in several ways; in the two ways of doing so illustrated here, heat applied at the upper end of the core heats its tip.

In FIG. 3, an induction heater 22 is provided above the vertical tube furnace to selectively heat the metal without heating the polymer, as the non-conductive polymer is unaffected by electromagnetic energy emitted by an induction heater. In FIG. 4, a cartridge heater 30 is provided, which heats a member 28 of good heat conductivity such as a copper rod; member 28 is disposed in good heat transfer relation to the metallic rod 10, thus heating rod 10 separately from polymeric sheath material 12. The preform is supported by a metallic tube 24, with setscrews 27 retaining the preform therein; a ceramic insulator 26 is proved to avoid direct heating of tube 24 by cartridge heater 30. Other means of separately heating the metal and polymer will occur to those of skill in the art. In a further refinement, a metal cone 17 heated by, e.g., a cartridge heater (not shown), provides selective heating to the preform tip. This allows reduction of the amount of heat applied to the preform body, avoiding problems such as discussed in connection with FIG. 2.

Heating the metal 10 separately from the polymer 12 allows the metal to be completely molten, while the temperature of the polymer is such that while it is softened so as to be "drawable", it retains sufficient strength to "pull" the metal. Without limiting the invention to this particular theory of operation, it appears that as the polymer material is drawn out it effectively forms a fine tube; the molten metal then fills this tube by capillary action, forming a very fine filament. Separate control of the temperatures of the metal and polymer allows the metal to be heated to the point of fluidity, enhancing capillary action and allowing the metal to flow within the polymer, both of which are important to obtaining a consistent and uniform metal core.

It should also be appreciated that the word "melted" and its cognates, e.g., "molten", as used in reference to the process of the invention are to be read in context: that is, the metal is necessarily more completely transformed to the liquid state in order to flow within the tube formed by the polymer, which by comparison is softened but does not reach the liquid state.

It is within the scope of the invention to alter the characteristics of flow of the metal by adding different chemicals, or by provision of surface coatings of various types to the elements of the system. For instance, the "flowability" characteristics of the metal might be drastically improved by coating the metal rod in a suitable flux, e.g., a soldering flux, prior to inserting it into the polymer preform. However, unless the flux is compatible with polymer, a weaker metal/polymer interface may result. Other surface coatings are discussed in detail below.

Figure 5:
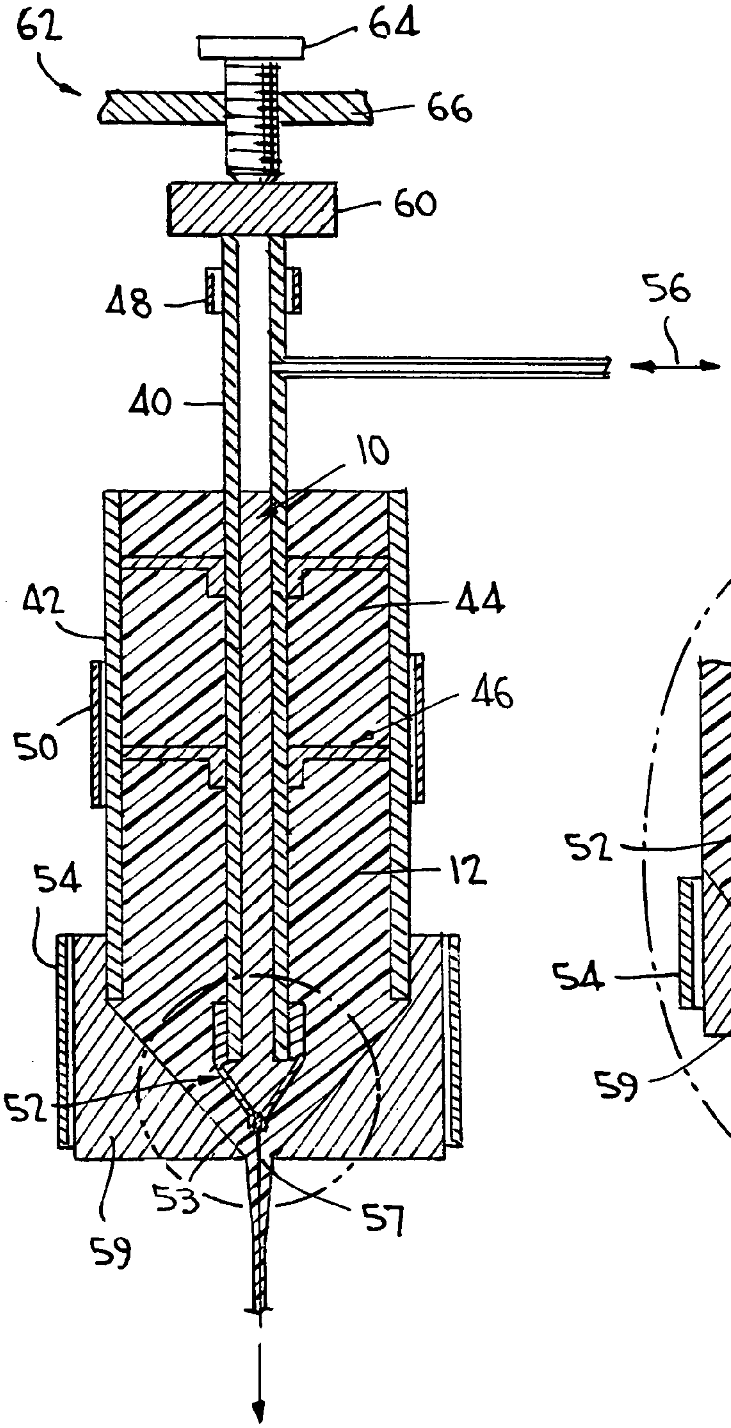
FIG. 5 shows a schematic cross-sectional view of a double-crucible embodiment of apparatus according to the invention for producing a filament comprising a codrawn metallic core in a polymeric sheath.
Figure 6:
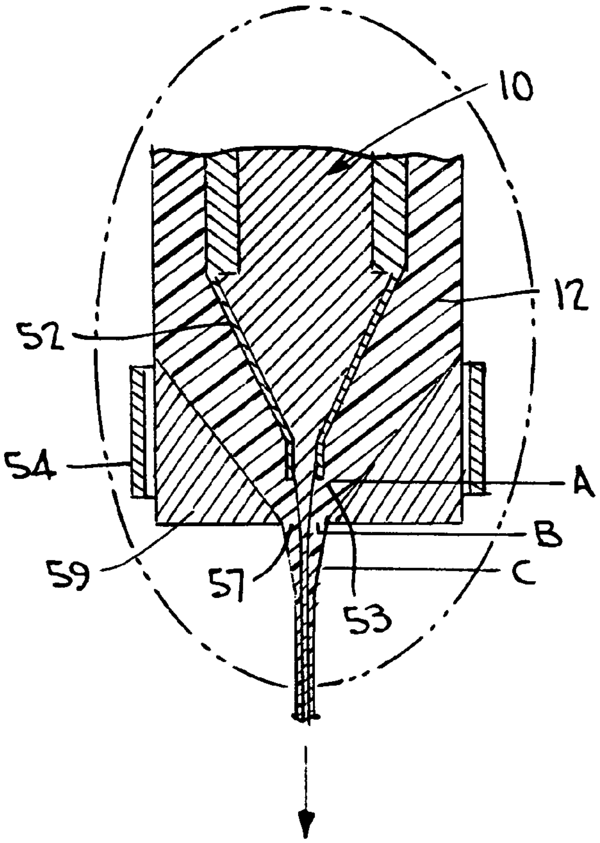
FIG. 6 is an enlarged view of a portion of FIG. 5.

The inventors have also performed substantial testing, detailed below, showing that it is also possible to codraw a metallic central conductor and a polymer sheath using a "double-crucible" approach, as illustrated in FIGS. 5 and 6. In this embodiment of the invention, the metal 10 intended to become the conductive core is melted in an inner crucible 40, while the polymer 12 is melted in an outer crucible 42; an aligning device, possibly comprising upper and lower members 44 and 46, each comprising inner and outer rings spaced from one another, maintains the inner and outer crucibles in alignment. The inner crucible 40 and thereby the metal 10 that will become the conductor may be heated by a band heater 48 in contact with the inner crucible 40. To ensure efficient heat transfer to the metal 10, while avoiding formation of undesired interalloy compositions, the inner crucible 40 can be made of a material that is a good heat conductor, that is of higher melting point than the polymer sheath or the indium core metal, and that does not react with indium, e.g., graphite, platinum, or possibly gold- or Teflon-coated steel. (If the metal is to be heated other than by heating of the crucible per se, for example by induction heating, the inner crucible need not be a good conductor of heat; in that case a ceramic material might be useful.) Apart from the cost issue, platinum might be a good initial choice. As the polymer is of higher melting point than the metal 10, the fact that the polymer will be in contact with the outer surface of the inner crucible does not present any difficulty.

The polymer 12 (which is typically supplied in granular form, so as to be conveniently poured into the upper end of the outer crucible) can be heated by a second band heater 50 in good thermal contact with the outer crucible 42, which can be made of aluminum, stainless steel or another convenient metal. The heat applied to the polymer pellets is controlled such that a thick liquid of tar-like consistency is formed, which is suitable for practice of the invention.

A metallic tip 52 will typically be provided over the lower opening in inner crucible 40. Tip 52 will preferably be made readily replaceable, to allow ready adjustment of process parameters as desired. The outer crucible 42 may also be terminated by a replaceable tip 59, again in order to allow ready adjustment of process parameters for optimizing the process. A third band heater 54 may be provided to allow separate control of heating of the polymer in the vicinity of the tip 59.

As indicated by double-headed arrow 56, it may be desirable to apply compressed air, another gas, or vacuum to the interior of inner crucible 40, which is capped at 60 for the purpose. Provision of compressed air would be useful in controlling the flow of the molten metal; however, noting that molten indium can oxidize in the presence of oxygen, supply of a purging gas such as nitrogen might be preferable. Application of vacuum would slow flow of the metal. For example, one can readily envision beginning a long production run by first commencing drawing of the polymer, establishing stable drawing of in effect an elongated very small diameter tube, and then applying compressed gas at 56 to start flow of the molten metal. Compressed gas or vacuum can then be applied to control the rate of metal flow, e.g., responsive to control signals provided by downstream monitoring devices discussed in connection with FIG. 7. Compressed gas or vacuum might also be useful in controlling flow of the polymer as well.

FIG. 6 shows an enlarged view of the tip region of the double-crucible arrangement of FIG. 5. Three relative positions, labeled A, B, and C, are identified at which the molten metal in the inner crucible can be introduced into the stream of softened polymer being drawn from the outer crucible. This point can be controlled by allowing relative motion of the inner crucible 40 with respect to the outer crucible, as indicated schematically at 62, where an adjusting screw 64 threaded into a support member 66 controls the axial position of inner crucible 40. For example, as shown in FIG. 6, the orifice 53 of the inner crucible can be located such that molten metal is introduced to the polymer sheath inside the orifice 57 of the outer crucible (position A), outside the orifice 57 of the outer crucible (position C), or approximately at the minimum opening of the orifice 57 (position B).

It will be apparent that the relative diameters and relative positions of the orifices 53 in the inner crucible and 57 in the outer crucible must be selected carefully in order to control the relative dimensions of the core and sheath, so that the desired ratio of the diameter of the core to the overall diameter of the microwire is achieved.

More specifically, if the metal is released inside the outer crucible (that is, with the orifices in relative position A), the polymer into which the metal is released is relatively hot. This position appears to allow the stable flow of molten metal into a softened polymer sheath without application of external force, e.g., by way of compressed gas at 56. However, if the polymer is too soft, the polymer may not be able to support the molten metal column and most of the metal will be released uncontrollably. If the orifice 53 in the inner crucible tip is outside the orifice 57 of the outer tip (position C), metal can be released into a partially hardened polymer matrix, such that the polymer melt strength will be sufficient to stretch the molten metal. However, if the polymer is too hard, subsequently stretching the polymer/metal system to a very small diameter may be problematic. A good compromise might be found if both tips are substantially aligned with one another (position B). The optimal relative position, again, will be determined by experimentation with these as well as other relevant process parameters.

As noted, in addition to investigating the optimal point at which the metal is introduced into the polymer stream, a second parameter to be investigated is the relative sizes of the exit apertures of the outer and, the inner crucibles. This parameter works in conjunction with the relative placement of the respective apertures in the outer and inner crucibles to assist in controlling the core/clad ratio, that is, to achieve the desired ratio of the diameter of the metal conductor to the overall filament diameter.

A third parameter to be investigated is the differential temperature between the metal and polymer, as well as their individual temperatures, which will likely affect the respective flow rates and thus the ratio of one to the other.

A further parameter to be investigated is the drawing rate, that is, the degree to which the fiber precursor exiting the orifices is drawn down and reduced in diameter by spooling at a high rate.

It will be appreciated by those of skill in the art that the viscosity of molten metal varies significantly with temperature, such that optimization of the metal temperature will be important in establishing optimal processing conditions. However, raising the temperature excessively may lead to oxidation of the metal, which in turn may require processing in a controlled atmosphere. Control of the surface tension of the molten metal may be desirable, and might be effected by provision of fluxing agents, but this in turn may affect the mechanical properties of the fiber, e.g. by interfering with the bond to be formed between the metal core and polymer sheath.

Experimentation intended to optimize the key process variables, e.g., relative sizes and spacing of the orifices, temperatures, pressure or vacuum applied, drawing rates, and other parameters was ongoing as of the filing of parent application Ser. No. 11/976,196, and continues through the filing of this continuation-in-part application. Inner crucible orifices 53 of between 10 and 125 mils diameter were tested; preliminary results indicate that orifices of 50-75 mils for the inner crucible were suitable. The diameter of the orifice of the outer crucible appears to be less critical, being principally a factor in the thickness of polymer to be obtained. Successful tests were performed using an outer orifice diameter of 0.332" and an inner orifice diameter of 0.057", with the orifices in relative position B, that is, with the orifices substantially aligned with one another. Fiber of 2-4 mils final diameter was successfully drawn at a winding speed of 140-200 feet per minute using these parameters. Fiber was successfully drawn using both PC 6457 and PETG GN 007 as the polymer, with Indalloy 290 as the metal core. The band heater was set to 500-525 degrees F. during these tests. The temperatures of the polymer and metal were not directly measured during these tests. However, preliminary testing with the inner crucible removed and the outer crucible entirely filled with polymer indicated that the temperature at the exit orifice was generally about 75 degrees F. less than the temperature of the band heater 54.

Further experimentation to establish optimal processing techniques and conditions as above, including separate control of the temperatures of the metal and polymer, and the application of an compressed gas stream or vacuum to the inner and/or outer crucibles in order to increase or decrease the amount of molten metal and polymer discharge, is considered within the skill of the art.

It is also within the invention to apply heat to the filament after initial formation, e.g., by pulling the filament through a tubular oven, so as to keep the metal/polymer filament hot, allowing further reduction in diameter by elongation than would be possible if the filament were substantially immediately cooled by the ambient air. Such reheating and further reduction could also be done in a separate step after initial cooling and spooling of the fiber.

It is contemplated that scaling up the laboratory work performed thus far to a production-scale operation will best be accomplished by construction of a fiber drawing tower 70, using, where applicable, equipment and techniques known in the manufacture of optical fiber. FIG. 7(*c*) shows schematically the basic components now envisioned for such a tower; as illustrated, either the rod-in-tube method, indicated at FIG. 7(*a*), or the double crucible arrangement, indicated at FIG. 7(*b*), may be employed for fiber formation, followed by monitoring and control instrumentation and by material handling equipment, such as spoolers and the like.

It is envisioned that the wire quality can be effectively and continuously monitored by providing four principal instruments as part of the fiber drawing tower 70. The first is a micro-wire diameter monitor 72 that will ensure that the diameter of the fiber remains constant at a desired size, e.g., 25 microns. This monitor provides information to the take-up roller assembly 74, which controls the speed of the process. That is, as noted, considerable elongation and corresponding reduction in diameter of the polymer/metal system will take place after initial formation, due to tension applied by the take-up roller assembly 74. The wire diameter monitor 72 also provides information to a computerized preform feeder 76, if the rod-in-tube method is employed, to supply additional metal and polymer to the crucibles, or to apply compressed air or vacuum, as indicated at 78, to either or both of the inner and outer crucibles, if the double-crucible method is employed, to increase or decrease the feed depending on the speed of the draw.

The second, third, and fourth instruments may not necessarily be used to control other portions of the machine, but may be employed to provide alerts when the process has moved beyond acceptable tolerance limits. The second instrument, a metal core continuity detector 80, will detect any discontinuity in the metal core. The third instrument is a core/clad ratio detector 82, to determine whether the desired core/clad ratio is being properly maintained. The fourth instrument is a core/clad concentricity monitor 84 to insure that the fiber is round and that the insulative sheath is satisfactorily uniform. Finally, tension of the fiber is monitored and controlled by a multiple-roller fiber pulling device 86, e.g., of the type known in the art as a "Godet roller", to maintain the fiber at a desired size.

Identifying a suitable micro-wire diameter monitor 72 is a straightforward task. There are many companies from whom this type of equipment, as used in the fiber-optic industry, can be obtained and evaluated. For example, a Zumbach Laser Scanner model ODAC 15XY-JM with associated data processor USYS IPC 2 can be used in a feedback loop with the Godet roller 86. The take-up roll 74 can be driven at a speed 2-5% faster than the Godet roller 86.

The metal core continuity detector 80 is required in order to insure that the fiber being drawn contains a consistent metal core. Three methods of metal core detecting are currently contemplated: laser scanning, capacitance measurements, and methods based on magnetic properties such as very low frequency pulse induction, and beat-frequency oscillation. As of the filing of this continuation-in-part application, laser scanning using a 2 megapixel CCD camera has been successfully tried. In order to choose the best approach, it will be necessary to obtain equipment operating using each of these methods and to evaluate their capabilities by running trials at different speeds using prototype yarns.

Two possible approaches to implementing a core/clad ratio detector 82 have been considered. The first involves illuminating the fiber with a laser beam and monitoring passage of the beam with a CCD camera or the like. Optical inspection of the metallic core would be effective because the polymers preferred for the insulative sheath of the micro-wire are transparent. The laser can "see" through the polymer to the core, such that an optical detector on the opposite side of the fiber from the laser can image the conductive core. Such a device is available from the same companies that produce fiber-diameter detector sensors. A second method measures reflected light, again by means of a CCD camera. Devices that appear likely to be useful are available from manufacturers of commercial machine vision systems, e.g., Toshiba Teli Corporation, Elbet Vision System and Keyence Corporation of America.

A core/clad concentricity monitor 84 can operate on the same technologies described above for the core/clad ratio detector, that is, the combination of a laser, LED, or other illumination source with a CCD camera and suitable data-processing components and software. In both cases, the light source would illuminate the fiber and the CCD camera would capture the data, and computer software would be used to convert the data to core/clad ratio and core/clad concentricity information. The functions of instruments 82 and 84 could also be performed by a single instrument.

As discussed above, the microwires of the invention can be used in various ways, depending on the final product desired. Multi-filament yarns can be created using the micro-wire fibers. Multi-filament yarns will carry higher current than single filament yarns, and will also facilitate creating a reliable interface with connectors. Twisting and core-wrapping are two potential methods of producing multi-filament yarns using microwire fibers according to the invention.

The microwires of the invention can be combined with other multifilaments as desired to produce desired yarn characteristics, e.g., modulus, tensile strength, and bulk, and to conceal and protect the microwires. Multi-filament, twisted yarns might desirably be made from either 100% microwire fiber, or of some blend of microwire fibers and textile grade polymeric fibers, possibly 50% microwire fiber and 50% polyester. A polyester/microwire blended yarn is expected to better satisfy the requirements involved in weaving than a yarn consisting only of the microwire fibers. To create a 100% microwire yarn, 30 "ends" (i.e., individual fibers) of microwire fiber can be used. For a 50/50 blend, 15 ends of microwire fiber can be twisted with one end of 70 denier multi-filament polyester yarn. The 100% microwire yarn can be expected to have higher conductivity for the same size yarn when compared to the blend, and, when attaching a connector, it would have higher probability of connecting with the metal core. On the other hand, the blend can be expected to be more durable and to possess more satisfactory textile processing qualities.

A "bundle" comprising multiple ends of microwire fiber (approximately 15 ends) can also be wrapped or cross-wrapped with two ends of 40 denier multi-filament polyester yarn. Wrapping is a simpler and less costly process, whereas cross-wrapping would provide more coverage to the microwire bundle, and therefore, more protection. Contrasting twisted versus core-wrapped yarns, the former is a fast and economical method of producing yarns, whereas the latter would be expected to produce a more durable yarn and to optimize both current transference and reliability when interfacing with connectors.

Once an optimum conductive yarn (single or multiple ends) is identified, it can be integrated into a fabric by weaving or by knitting. For example, to make a woven fabric, 150 denier polyester yarns might be used as the warp, and the micro-wire yarns or yarn blend as the filling. For knitted fabrics, a single stitch knitting method can be exploited to incorporate the micro-wire yarn or yarn blend into a fabric. This knitted method produces continuous conducting fiber throughout the fabric.

Both woven and knitted fabrics can be produced in order to address a range of military and commercial applications. Woven material is likely to be more appropriate for military or higher durability applications, whereas knitted fabric is likely to be more appropriate for consumer goods such as heated gloves and undergarments.

It will be self-evident that proper selection of the materials of the metal core and of the polymer sheath is essential to successful implementation of the invention. The selection process is summarized here for completeness of this application. Of course, the invention is not to be limited by the work performed or contemplated, nor to the materials mentioned herein.

Polymer selection must be done carefully to satisfy certain end product and processing requirements:

Is the polymer suitable for textile applications?

Can the selected polymer withstand repeated textile cleaning cycles?

Does the polymer exhibit the necessary melt behavior at a suitable temperature to enable its use in the rod-in-tube method or the double-crucible method?

Is the polymer rheology, specifically the "melt flow index" at a suitable pressure and temperature, of the polymer suitable for micro-fiber drawing? A "melt flow index" (this term being used as generally in the art) of between 6 and 14 is recommended for fiber drawing.

Is the polymer transparent, so as to allow optical inspection of core continuity? (If not, X-ray or high energy electromagnetic beam methods can be used for fiber inspection.)

A series of polymers were melted and tested for their ability to form micro-fibers. The initial investigation included the following polymers, each being melted and fibers drawn from the molten bath.

Polycarbonates (Bayer Macrolon series 3100, 3103, 6457)

Acrylics (Autofina-Altuglas VO52, DR 101, MI7)

Polyesters and modified polyesters, including in these polyethylene terephthalates, specifically glycol-modified polyethylene terephthalate (Eastman Chemical PCTG, Provista, GN 007, PETG 6763, and PETG with heat stabilizers)

Polyurethanes (Dow Pellethane 2102-90AE and 2102 65D)

Nylon (EMS Grilamid L20 GHS)

Bayer Polyethers, PE

Inomers (Bayer Texin 990, DuPont Surlyn 8920, DuPont Engage 8440)

Focusing on ease of use and end use suitability, two polymer families were selected for initial testing of the method of the invention, namely, polycarbonate and glycol-modified polyethylene terephthalate (PETG). (As discussed below, other polymers were tested later.) A few hundred yards of continuous fibers were drawn using R&D scale equipment. To ensure mass production suitability, several thousand yards of fiber made using a single type of polymer were drawn on commercial equipment.

Polycarbonates demonstrate high strength, toughness, heat resistance, chemical resistance, and excellent physical property stability. Flame retardants can also be added to polycarbonate without significant loss of physical properties.

Two different grades of Bayer polycarbonate products, Bayer Macrolon 3103 and Bayer Macrolon 6457, were chosen for their superior melt characteristics, strength, and transparency, and for their ability to form fibers. The chemical structures of these polymers are similar but contain different additives to provide specific properties to the end product. Other polycarbonates might also be useful, but it is to be noted that certain polycarbonates may not withstand hot water, raising wet processing issues to consider for garments made of polycarbonate.

Polycarbonates are long-chain linear polyesters of carbonic acid and dihydric phenols, such as bisphenol A. The presence of the phenyl groups on the molecular chain and the two methyl side groups contribute to molecular strength. In addition, the attraction of the phenyl groups between different molecules contributes to a lack of mobility of the individual molecules resulting in good thermal resistance and relatively high viscosity (i.e., low melt flow) needed for the process of the invention. The lack of mobility also prevents the polycarbonate from developing a significant crystalline structure, thus providing light transparency.

Glycol-modified polyethylene terephthalate, or PETG, was also considered because of suitable melt behavior and adaptability in a textile environment. PETG is a copolyester, clear amorphous thermoplastic with 90% light transmission. PETG has been known for over 40 years and its utility in the textile industry, including military textiles, is proven. The PETG polymer comes in many forms containing different additives, including heat stabilizers. These modified polymer systems are slightly more expensive but provide desired engineering properties. The incorporation of glycol modifiers minimizes the brittleness of polyethylene terephthalate (PET) and provides a flexible fiber that can be woven into conformable fabrics. Unstressed PETG exhibits good resistance to dilute aqueous solutions of mineral acids, bases, salts, and soaps. PETG also has good resistance to aliphatic hydrocarbons, alcohols, and a variety of oils. Halogenated hydrocarbons, low molecular weight ketones, and aromatic hydrocarbons dissolve or swell this polymer. PETG has many features similar to PVC with similar temperature resistance and durability. PETG has found a market where customers are looking to produce an "environmentally" friendly product. Considering cost and overall performance, testing was performed using two Eastman Chemical polyethylene terephthalate (PETG) polymers, PETG 6763 and PETG GN007.

Testing clearly demonstrated that Macralon 3103, Macralon 6457 and PETG GN 007 are relatively easy to draw, can be drawn to very small diameter, and fall within acceptable limits for fiber production with regard to other properties considered. These three polymers were therefore chosen for initial testing.

The metal to be used to form the conductor of the micro-wires of the invention must likewise satisfy certain criteria. Since most metals melt at temperatures over 1000° F., much higher than polymer melting temperatures, only a limited number of metals are available for this work. This limited number is further narrowed down by the electrical and crystalline structure requirements. Therefore, the metal must be selected with thorough understanding of both metal characteristics and the physical properties of the end product. The following issues were considered during metal selection.

Does the metal have sufficient electrical conductivity (maximum resistivity 9 micro-ohm-cm)?

Does the metal melt at a much lower temperature than the polymer melting/drawing temperature?

Does the crystalline structure of the metal contain a sufficient number of slip planes to provide high ductility at lower temperatures?

Are the surface tension characteristics of the molten metal such as to provide suitable flow and wetting properties at the polymer/metal interface?

Does the metal-polymer system require surfactants to modify the contact angle at the polymer/metal interface?

Does the selected metal have a good strain/cyclic fatigue resistance?

Does the metal solder easily?

Can the metal form connections that are strong enough to hold electronic components?

Is the metal user friendly, containing no toxic materials such as lead or cadmium?

Is the metal affordable?

During the metal selection process, special consideration was given to four major characteristics: melt temperature (considering both liquidus temperature $T_{m,l}$ and solidus temperature $T_{m,s}$), ability to stretch (% elongation at ultimate tensile strength), resistivity (% resistivity relative to copper) and the thermodynamics of metal melting (as illustrated by phase diagrams). After a careful literature search, the inventors initially proposed the metals listed below, which satisfy all the concerns mentioned above. All of these metals were purchased from Indium Corporation of America (ICA) and are identified herein by ICA's product designator "Indalloy" followed by a number that indicates the composition of the alloy; the actual constituents are listed below, together with their liquidus and solidus melting points, $T_{m,l}$ and $T_{m,s}$ respectively, in degrees F. Note that all of ICA's metals are called Indalloy, even though two of the products evaluated (Indalloy 121 and Indalloy 241) do not actually contain indium, and although Indalloy 4 is actually pure indium; note further that the constituent percentages given below all refer to percentages by weight.

Indalloy 4—pure indium ($T_{m,s}$-314 F, $T_{m,l}$-314 F)

Indalloy 290—97% indium, 3% silver ($T_{m,s}$-290 F, $T_{m,l}$-290 F)

Indalloy 3—90% indium, 10% silver ($T_{m,s}$-289 F, $T_{m,l}$-459 F)

Indalloy 1E—52% indium, 48% tin ($T_{m,s}$-244 F, $T_{m,l}$-244 F)

Indalloy 121—96.5% tin, 3.5% silver ($T_{m,s}$-430 F, $T_{m,l}$-430 F)

Indalloy 241—95.5% tin, 3.8% silver, 0.7% copper ($T_{m,s}$-423 F, $T_{m,l}$-428 F)

The rod-in-tube method of FIG. 1 was initially employed to test various combinations of metals and polymers. The test procedure was essentially as follows. Polymer-rods of 0.34" diameter were prepared in a vertical pipe extruder, sectioned to about 1 inch in length, and drilled using a 32 mil drill bit in a high speed drilling machine. 30 mil Indalloy wires were cleaned by dissolving the outer layer of metal in 5-10% hydrochloric acid for 1-5 minutes and then washing the metal in acetone. Next, the wires were inserted into the center holes of the polymer rods, forming metal-centered polymer preforms. These were then placed in a vertical metal oven comprising two 400-W band heaters, and heated until the tips reached their melting point. When this occurred, the tips were drawn down to produce micro-wires.

More specifically, even if one starts with a square-ended preform, when melting commences, it becomes pointed as shown in FIG. 1. It appears useful to heat the preform in the vicinity of its tip, e.g., by a conical heater 17 in FIG. 4. Once the polymer starts to melt, it is ready to flow and one can grip the pointed tip of the preform with a pair of pliers, pull it to a take-up spool 74 (FIG. 7) and commence drawing of the microwire. To assure the presence of metal, the preform can be prenotched as at 98 in FIG. 2(*e*).

In order to understand the compatibility of polymer and metal alloys, a series of trials were conducted using three different polymers and a selection of metal alloys. The polymers chosen for the trials were Macrolon 3103, and Macrolon 6457, which are polycarbonates as noted above, glycol-modified polyethylene terephthalate PETG GN007. Of the 6 metals listed above, Indalloy 4 (100% Indium), Indalloy 290 (97% Indium/3% silver), Indalloy 3 (90% Indium/10% silver) and Indalloy 121 (96.5% tin/3.5% silver) were selected as the initial metals for evaluation. Observations and comments from these trials are listed below.

Indalloy 121 (Eliminated from Further Testing)

- Melts at relatively high temperatures (430+° F.)
- Both liquidus and solidus temperatures are the same, i.e., there is no liquid phase below 430° F.
- At relatively high temperatures where metal softens, a strong polymer can stretch the softened metal to form ribbon shaped wires.
- At moderate temperatures, where the polymer melts but the core metal stays hard, the metal wire tends to anchor the polymer around it. This results in skin drawing around the metal wire where preform diameter reduces significantly. It also results in an end product that does not contain metal.
- Unless the tip temperature is high, fiber tends to break at the un-molten metal tip.
- Selection of optimum temperature is difficult and needs more attention.
- Unless a very high temperature polymer is considered, the metal is not easy to draw. This may not be the best metal composition to be used in this project.
- Eliminated from further testing because of low conductivity (16% of Cu) and high melt temperature.

Indalloy 3 (Eliminated from Further Testing)

- Has a very wide liquidus-solidus window ($T_{m,s}$-289 F, $T_{m,l}$-459 F). A wide window can be advantageous or disadvantageous depending upon the polymer processing conditions.
- At 500°-600° F. processing temperatures, the core wire temperature stayed below the liquidus temperature (459° F.) and the preform wire stayed at a semi-solid state.
- During the fiber draw process, the molten portion of the metal tends to stretch nicely, yet the metal that is not molten tends to resist stretching, causing thick and thin sections.
- Above 600° F., the polymer melts very quickly and the core wire temperature reaches approaches its liquidus temperature. However, the wire temperature still stays below liquidus. At these temperatures, the polymer loses its melt strength and the effectiveness of drawing diminishes.
- The end products have many thick and thin sections which are not acceptable.
- Eliminated from the list of potential metals.

However, it is possible that some of the technical difficulties causing this potential choice for the core metal to be eliminated from initial testing might be resolved by heating the metal core independently from the polymer body, as illustrated in connection with FIGS. 3 and 4, or by use of the double-crucible method.

Indalloy 290 (Selected for Further Testing)

- Melts very easily. ($T_{m,s}$-290 F, $T_{m,l}$-290 F)
- At processing temperatures above 500° F., metal wire melts and stays very liquid. In the liquid stage, metal tends to ball up to reduce its surface free energy. During fiber drawing, the liquid metal flows very nicely with the polymer.
- Capillary action seems to drive the molten metal through the center of the tube formed by drawing the polymer and produces a uniform metal core.
- Very consistent and uniform core (no thick and thin sections).
- Produced very nice sample at processing temperatures above 500° F. (For polycarbonate 525-540° F. appears optimal, while for PETG 500-525° F. is best.)
- Satisfies all the required criteria to produce an electrotextile.
- Worth pursuing further in both preform drawing and double crucible method.
- Cost is $23.36 per gram Indalloy 4 (Pure Indium) (Selected for Further Testing)

- Melts at very low polymer processing temperatures.
- Can be used with all three selected polymers (Macrolon 3103, Macrolon 6457, and PETG).
- At processing temperatures above 500° F., metal melts and flows very nicely in the polymer center.
- Fine wires with very uniform core can be produced.
- Worth pursuing in both preform and double crucible methods.
- Cost is $25.95 per gram As indicated, the conductivity of Indalloy 121 is somewhat lower than the required conductivity values for this project. In addition, Indalloy 121 melts at a relatively high temperature and is less compatible with the selected polymers. Indalloy 121 was thus eliminated from further consideration.

Similarly, Indalloy 3 demonstrates a very wide liquidus-solidus window. Consequently, at low processing temperatures, the un-molten portion of the metal tends to form thick and thin spots in the drawn product. Unless the processing conditions are changed drastically (e.g., perhaps by selectively applying intense heat to the tip of the preform, or by heating the core using an independent heater, as illustrated in FIG. 4), this alloy is not suitable for practice of the invention. Consequently, Indalloy 3 was eliminated from further testing.

The experimental observations together with metal characteristics indicated that at least two metals tested thus far (Indalloy 290 and Indalloy 4) are user friendly and can be utilized to produce the micro-wires of interest. Both Indalloy 4 (100% indium) and Indalloy 290 (eutectic indium-silver) melt at very low temperatures (below 315° F.), and can be melted at polymer processing temperatures. These two alloys also satisfy the conductivity requirements needed for this work. They are relatively compatible with the selected polymers and can be easily drawn. When the metal is encapsulated and heated in the polymer preform, the molten metal follows the shape of the center hole. When the polymer is drawn to small diameter fiber, the metal stays trapped in the center hole resulting in a very uniform conductive center core.

Central to mass production of the desired micro-wires is the combined performance of the down-selected polymer and metals. After several trials, the initial set of polymer/metal combinations were reduced to combinations of three potential polymers (Macrolon 3103, Macrolon 6457 and PETG GN 007) and two indium alloys (Indalloy 290 and Indalloy 4). The performance of these three polymers in combination with the various metals can be summarized as follows.

Macrolon—PC 3103 and Indium Alloys

- Polymer very transparent (88% transmission) allowing the metal core to be visible through an optical microscope. Easy to detect core continuity.
- The particulate material as supplied needs to be dried at 250 F for at least 4 hours before use or bubbles may appear in the molten polymer bath.
- The polymer exhibits high-melt strength, so that the polymer can force the core metal to stretch during drawing.
- The polymer melts at relatively high temperatures, at which the core metal can be completely melted.

- Unless the preform tip is heated separately, or is heated more than the remainder of the preform, the "skin drawing" effect can be problematic. This is a condition in which softened polymer is drawn from around the metal core while the center of the preform is not drawn. This phenomenon can be triggered by several factors, including high polymer melt strength. If the core metal is not melted, it tends to anchor the polymer around it and the skin draw effect becomes prominent. As noted, by concentrating the heating at the tip, skin draw can be avoided and fiber successfully drawn.
- This polymer is reported to have a low MFI of 6.5 g/10 sec at 300° C. at 1.2 Kg. Melts and flows well around 525°-575° F. (best at 540° F.) where the metal core melts completely.
- High heat is needed in a continuous production where preform is continuously inserted into the oven.
- PC 3103 plus Indalloy 4 or Indalloy 290 can be a good combination to produce micro-wires of about 2-3 mils (50-75 microns).

Macrolon-PC 6457 and Indium Alloys

- The polymer is very sensitive to humidity, so that the particulate material as supplied must be dried at 250° F. for 4 hours prior to use. If not dried, bubbles form and the drawn fiber becomes relatively opaque and streaky.
- The polymer flows at temperatures above 500° F. and thus can be drawn above the melting temperature of Indalloy 4 or Indalloy 290.
- Reported to have medium melt strength at fiber drawing temperature of 525°-540° F. During fiber drawing, the preform skin is not pulled as hard as in Macrolon 3103, resulting in less skin draw effect.
- Can be drawn to very small diameter fibers (1-2 mil)
- Good polymer to work with. The polymer has balanced properties of melt temperature, MFI, and melt strength.
- Excellent performance both with Indalloy 4 or Indalloy 290

PETG GN 007 and Indium Alloys

- Very transparent polymer (90% transmission). The metal core is visible through an optical microscope. Easy to detect core continuity.
- Again, the particulate polymer material needs to be thoroughly dried, e.g., at 180° F. for 6 hours.
- Polymer has been previously selected for military clothing industry by a major military contractor.
- Melts at lower temperatures (below 500° F.).
- Very low melt strength around 500° F. Polymer may need heat stabilizer to enhance the melt temperature.
- Can be drawn very well at low temperatures and can be drawn to very small diameter fibers (0.5-2 mil).
- If heated zones are appropriately adjusted, both metal wire and preform tip (polymer) can be melted simultaneously and good wires can be drawn.
- If the heated zones are not adjusted properly, fiber drawing can be very difficult. Preform necking and chunking can be problematic.
- Excellent performance with Indalloy 290.

As above, therefore, the inventors' experimental observations clearly show that any combination of either of two polymer systems, e.g., polycarbonates (PC) such as PC 3103, PC 6457, or glycol-modified polyethylene terephthalates (PETG) such as GN 007, and indium alloys (Indalloy 4 and Indalloy 290) included in experimental trials work very well in the rod and tube method. Any or all of these combinations may also work well in the double crucible technique. Each selected polymer/metal system provides different physical properties, so that the final selection must be made according to the end product requirements. The combinations of GN 007 or PC 6457 polymer system with Indalloy 290 or Indalloy 4 appear suitable for initial commercialization; each of these composite systems are relatively easy to process to form very fine wires.

More specifically, as to choice of polymer, PET is well accepted in the textile industry. Of the PETG family, comprising Provista, 6763, and GN 007, 6763 does not have additives, 007 is modified with a mold release, and Provista comprises a heat stabilizer. Given the choice, Provista performs better. Due to its higher melt temperature, both Indium 290 or Indium 4 can be run with Provista. Polycarbonate 6457 is also an option. However, as above PET is better accepted in the textile industry. Nylon EMS Grilamid L20 GHS can also be processed. This material is not as user friendly as Provista; however, nylon is more accepted for military clothing. Again, the invention of course is not to be thus limited.

In some circumstances the cost of indium may be a consideration in selecting a combination of metal and polymer for practice of the invention. Indium is relatively expensive, and the cost of indium or indium alloys depends on the quantity ordered and the physical form of the material. 30 mil indium wire costs approximately $25 per gram (about $25,000 per kilogram or $11,350 per pound). This wire was used in making the rod-in-tube preforms used in tests performed to date. However, indium in ingot form (14 mm deep×29 mm wide×149 mm long) costs significantly less at $1.45 per gram (about $1450 per kilogram or $658 per pound) than indium wire, which is a 95% price reduction. In large scale production, large diameter indium rods which can easily be formed from indium ingots can be employed in scaled-up rod-in-tube preforms. Further, since the shape of the metal does not play a role in the double crucible method, indium in ingot form can be easily used in this implementation. In either implementation, the use of indium ingots can be exploited to reduce the cost of the end product significantly, allowing indium to be used.

Experiments were also carried out using Indalloy 121, an alloy of 96.5% tin and 3.5% silver, in order to try to identify a material that might be acceptable at lower cost than the indium alloys otherwise preferred. This material was successfully processed, as described above. Therefore, although this material's conductivity is somewhat low comparative to indium and its alloys (Indalloy 121 tin/silver alloy is 6.2 times more resistant than copper, while the indium alloys can be as low as 4.2 times more resistant than copper), the cost of the material is very attractive. Indalloy 121 ingots cost about $0.06 per gram ($60.50 per kilogram or $27.50 per pound).

Therefore, although the price of indium ingots is far better than the price of formed wires ($1.45 per gram for ingots versus $25 per gram for wire), and though the tin/silver alloy exhibits somewhat lower conductivity than the objective, the price of the tin/silver alloys is so attractive ($0.06 per gram in comparison to $1.45 per gram for indium ingot metal) that the use of Indalloy 121 tin/silver alloy according to the invention may make certain end uses of the wires of the invention feasible where the cost of indium alloys would make the products impracticably expensive, and where moderately higher electrical resistance than copper is acceptable.

Ultimately, a successful method of connecting the micro-wires of the invention to various sorts of devices will be required in order to achieve useful wearable electronics. Although development of commercially viable connection technology was not within the scope of the project under which this invention was made, the inventors nonetheless needed to achieve connectivity to a measuring device in order to evaluate the conductivity of the micro-wires and to assist in determining the continuity of the metal core in the wire. The primary goal was to develop a reliable method of exposing the core metal to enable a connection, without causing damage to the core.

Four methods of achieving a connection to the metal core of the micro-wire were initially considered: a micro-pin system, an epoxy system, and two methods of removing the polymer sheath. The first two methods are fairly sophisticated, have not been tested, and are discussed below for completeness. Two methods of removing the polymer sheath were tested, as described below. Additional methods of making connection, developed after the filing of the parent application, are discussed below.

Depending upon the polymer sheath hardness (or brittleness), reliable connections to the microwires of the invention can potentially be achieved by a micro-pin system that punctures through the polymer coating, akin to a staple having a larger wire attached thereto, although this becomes increasingly difficult as relatively small (less than 50 microns) wires are employed. Where the metal core is less than 10 microns in diameter, the pin system must be much smaller than the core diameter of 10 microns to reduce the risk of electrical failure at the connecting point. A micro-pin system meeting these requirements has not yet been developed. Clearly, if the microwires of the invention were processed into multiconductor yarns, the odds of making good connections with one or several of the filaments using a micro-pin connector would be increased dramatically as compared with a single-filament conductor. If only signal-level currents were required to be carried, this method of making connection to the micro-wires of the invention might well be adequate.

Another method of connection that may prove satisfactory after development is to encapsulate the end of a micro-wire (or the ends of a micro-wire bundle) in an epoxy matrix and then polish the epoxy-encapsulated end to expose the micro-wires. The polished epoxy end can then be gold plated, and a connecting wire soldered thereto, establishing a connection to the core of the wire. Comparable techniques are commonly used in metallurgy when examining material under a scanning electron microscope (SEM).

A first attempt to remove the polymer sheath from the metal core utilized heat. A heated soldering iron tip was dragged across the micro-wire in an effort to deform the polymer sheath thermally. This effort was not successful. Since the polymer melts at a higher temperature than the metal, the heated tip damaged the metal core even before the polymer was partially removed. If the tip is too sharp, the tip tends to cut the metal wire while it is removing the polymer layer. In a related experiment, a heated metal bar was pushed against the micro-wire in an attempt to reach the metal core without damaging it. This was also unsuccessful. If the bar diameter was too big, the molten polymer together with the metal core was pushed away and establishing a connection to the metal core was nearly impossible.

Chemical methods of removing the polymer sheath, that is, using a chemical solvent to dissolve the polymer sheath, leaving the core untouched, proved to be more successful. The connection can then be made by soldering, possibly preceded by the epoxy-encapsulation and plating steps discussed above. A list of tested chemicals, microscopic observations, and comments are given in Table 5 of the Final Report. Of the chemicals tested, three chemicals (methylene chloride, ethylene dichloride, and N-methylpyrollidone) were ultimately used successfully to remove the outer core sheaths formed of each of Macrolon 3103, Macrolon 6457, and PETG GN007. The aggressiveness of these chemicals vary from high to low with methylene chloride being the most aggressive and N methylpyrollidone the least. If the micro-wires were below 2 mils, the cleaning was done using the least aggressive chemical.

Figure 8:
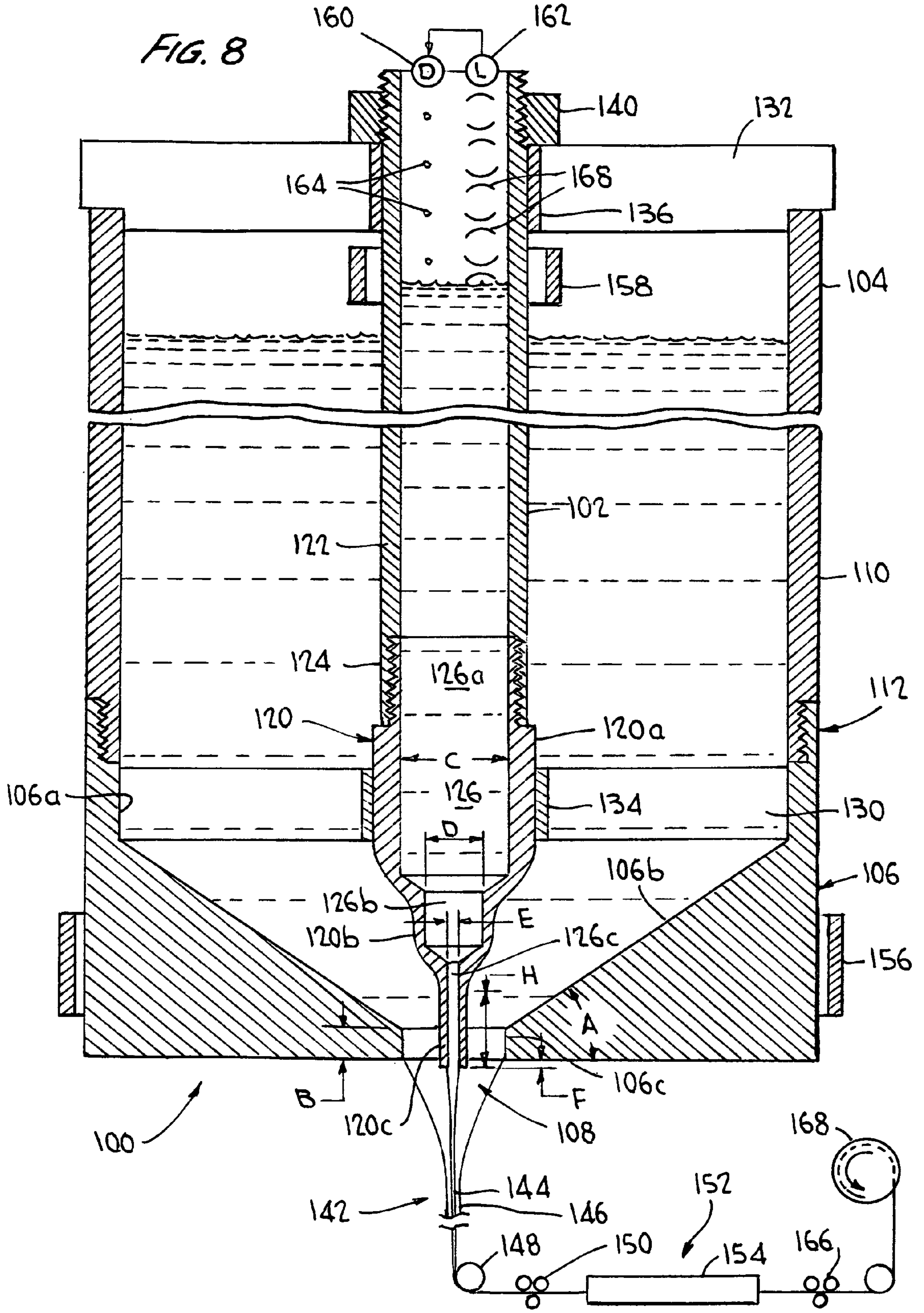
FIG. 8 shows a schematic cross-sectional view of a further preferred embodiment of the double-crucible apparatus, including a preferred design for the tip of the inner crucible.

FIG. 8 shows a preferred embodiment of a double-crucible design for practice of the invention that incorporates numerous improvements. As shown, the double crucible 100 again comprises an inner crucible 102, within which the low-melting point metal is melted, and an outer crucible 104, in which the resin is melted. The inner and outer crucibles may be separately heated, as discussed above, by means indicated schematically at 156 and 158 in FIG. 8.

As illustrated, the outer crucible 104 may comprise a lower cap 106, defining an exit aperture 108, threadedly attached as indicated at 112 to an upper section 110 made of a section of pipe. In a successfully-tested realization of this design, cap 106 was machined of stainless steel coated with nickel to enhance the flow. A nickel coating of about 1 mil thickness, applied by the well-known electroless nickel plating process, which resists temperatures up to 1500° F., appears to work well. Polytetraflouorethylene ("PTFE") might also be useful as a coating.

In the successfully-tested embodiment that is the subject of the detailed information provided herein, cap 106 is 3⁵⁄₁₆" in outside diameter, and the diameter of the inner cylindrical bore 106*a* is 2⅝". Bore 106*a* is terminated by a frustoconical lower surface 106*b*; this was machined so that the angle A between the surface of frustoconical lower surface 106*b* and the horizontal was 59°. The exit aperture 108 is 0.400" in diameter, and this dimension is maintained for a distance B of 0.125", forming a cylindrical discharge passage.

The inner crucible 102 comprises a tip 120 threaded into a section of tubing 122, as indicated at 124. As in the case of cap 106 tip 120 may also be formed of stainless steel coated with nickel or PTFE. Tip 120 comprises a main body section 120*a*, an intermediate body section 120*b*, and a orifice extension or "nipple" 120*c*. In the successfully tested realization of this design, the outside diameter of section 120*a* is 0.615" for a length of 0.962" (this length dimension including that of the threaded portion 124), the outside diameter of section 120*b* is 0.298" for a length of 0.114", and the outer diameter of nipple 120*c* is 0.080" for a length H of 0.218". In order to ensure smooth flow of the molten resin over the outer surface of tip 120, sections 120*a-c* are joined by smoothly-radiused contours, as illustrated; typical radii are between 0.140" and 0.220".

Tip 120 comprises an inner cavity 126 that is formed by successive drilling operations, such that frustoconical surfaces join the three corresponding sections 126*a*, 126*b*, and 126*c* thus formed in the inner cavity, as illustrated. In a successfully tested realization of this design the diameter C of section 126*a* was 0.406", diameter D of section 126*b* was 0.250", and diameter E of section 126*c* was 0.055".

One primary advantage of the design of tip 120 is that the nipple 120*c* defines a uniform outer diameter for a considerable length H, as described. More specifically, length H will typically be greater than the length B of the cylindrical discharge passage 106*c* in cap 106. Providing the nipple in extended form as illustrated permits vertical adjustment of the position of the extreme end of the nipple 120*c*, that is, the lowermost aperture from which the molten metal flows, with respect to the exit aperture 108 in the outer crucible, without effectively altering the cross-sectional area of the annular space between the nipple 120*c* and the exit aperture 108, which at least partially controls the flow rate of the resin. That is, this aspect of the design of the tip 120 allows independent adjustment of one important parameter of the process of the invention without altering another, which is highly useful in optimizing and practicing the process.

More specifically, the design of tip 120*c* is very critical to successful practice of the process of the invention. The design shown, featuring the extended nipple 120*c*, allows metal to be discharged just outside of the aperture 108 in the cap 106 without choking the polymer flow. By comparison, use of a simply-tapered inner crucible would reduce the polymer flow as the inner crucible were lowered with respect to the cap 106.

Still more specifically, it appears important to the practice of the invention that the outer crust of the polymer cone exiting aperture 108 is essentially "frozen", that is, that it is substantially solidified, just as it exits aperture 108. The substantially solidified outer portion of the polymer cone has sufficient matrix strength to support the molten metal column therewithin. It appears to be critical to discharge the metal from nipple 120*c* into the rapidly inwardly solidifying hot polymer cone just outside the aperture 108 in cap 106. In this area, the outer portion of the polymer cone is partially solidified, giving adequate strength to support the molten metal, while inside the polymer cone the polymer remains sufficiently fluid so as to be drawn down to a small fiber, together with the metal within. It appears that the entire partially solidified outer cone of polymer is continually drawn down and replaced by fresh, molten polymer, such that a stationary solid cone of polymer is not formed. However, the invention is not to be limited to this particular mode of practice.

More specifically, the outside of the polymer cone cools rapidly and both its viscosity and its melt strength increase correspondingly. As a result the polymer forms a partially solidified, but still comparatively soft shell that is being pulled down and replaced continuously. The viscosity decreases from outside to inside where the core has the lowest viscosity (that is, the greatest fluidity) at any given time. As a result of varying viscosities, some inter-laminar flow can easily take place; due to the softness of molten polymer, this flow does not create any defects or adverse effects. However, if the draw rate exceeds a certain speed, shear fracture may result.

It will be appreciated that the temperature of the polymer must be controlled so that its viscosity is suitable for practice of the invention. The viscosity of the polymers used in practice of the invention changes logarithmically with temperature and shear rate, that is, the rate of mechanical processing, e.g., drawing, in the practice of the invention. It is not possible to provide an exact value for the optimum viscosity to be employed. However, as of the filing of this continuation-in-part application it is the opinion of the inventors that a viscosity of between about 4000 and 10,000 poise is appropriate. PETG polymer, for example, has a viscosity of about 10,000 poise at 500° F. and a shear rate of 10. "Poise" as a specification for units of viscosity, that is, the resistance to fluid laminar flow in response to given applied force, and "shear rate" as a measure of processing speed, are used here as generally in the art.

As noted, the length H of the nipple 120*c* of tip 120 must be sufficiently long with respect to the length of the discharge passage 106*c* in cap 106 so that the relative positions of tip 120 and cap 106 can be adjusted without affecting flow, and so that intermediate tip portion 126*b* will not be too close to the inner surface 106*b* of cap 106, which would tend to restrict polymer flow. However, if the length H of nipple 120*c* is too long, it will create too resistive a path for flow of molten metal to flow.

Control of the hydraulic pressure of the molten metal in the inner crucible is important. The hydraulic pressure is a function of the column height of the molten metal. In order that a sufficiently large amount of molten metal can be provided without excessive hydraulic pressure, it is important that the internal volume of tip 120 be as great as practicable, which requires in turn that the internal volume of tip 120 be maximized as much as possible without interfering with flow of resin in the outer crucible. For this reason the tip 120 is provided with intermediate section 120*b*, having an internal diameter between that of the nipple 120*c* and the upper portion 120*a*, so as to provide the maximum amount of metal volume without increasing the height of the metal column.

More specifically, it is envisioned that the metal to be melted will be supplied in the form of metal pellets 164 by way of an automatic pellet feeder, shown schematically at 160, discharging pellets 164 in response to a control signal from a level-monitoring instrument shown schematically at 162, for monitoring and controlling the level of the molten metal in the inner crucible. Ideally, the height of the molten metal column will be maintained constant, assuring a constant rate of metal flow, and yielding consistent core diameter in the final microwire. The metal level sensor controlling the pellet feeder may be electrical, optical, or interferometric, use an ultrasonic or radar distance measurement method (as indicated schematically at 168), or otherwise. Provision of suitable pellet feeders 160 and level sensors 162 is well within the skill of the art.

In order to minimize variation in hydraulic pressure occasioned by variation in the amount of metal present, e.g. as pellets are supplied, it is desirable to maximize the ratio of the volume of the inner crucible to its height, that is, to maximize the cross-sectional area of the inner crucible. As above, this in turn requires maximization in particular of the inner diameter C of the largest portion 120*a* of inner crucible 102. An overflow pipe (not shown) can be provided extending from the inner crucible to a catchment reservoir to collect any extra metal, e.g., in the event of a malfunction of the pellet feeder, so as to avoid overpressurizing the polymer tube.

As noted above, provision of a nickel (or possibly a PTFE) coating on the inner surface of inner crucible 102 improves metal flow tremendously as compared to flow through an uncoated stainless steel crucible tip. Providing similar coatings on the outer surface of the inner crucible 102 and on the inside surface 106*b* of the cap 106 likewise helps the polymer flow around the inner crucible 102. Surfactants such as products sold by Indium Corporation under the designations 5RA and 5RMA, also referred to as flow aids, or flux, also appear to be useful in providing good metal flow characteristics.

As will be apparent to those of skill in the art, the ratio of the amount of metal to polymer in the fiber as it exits the respective apertures and is drawn to microwire size is critical. This ratio is controlled by the ratio of the relative sizes of the apertures 108 in the outer cap 106 (less the area of the inner crucible nipple 120*c*) and of the aperture in the nipple 120*c*, which accordingly is likewise critical. If aperture 108 is too big, the fiber cannot be drawn to microwire dimensions before the polymer solidifies, and of course the ratio of conductive metal to overall microwire diameter might be less than desired.

Conversely, if aperture 108 is too small, the microwires cannot be made at high speed, increasing the cost. Similarly, if the aperture in the nipple 102*c* is too small, the metal core becomes too small, which increases the resistivity of the fiber. In general there appears to be no technical impediment to scaling up the entire apparatus to increase the rate of production of microwires according to the invention.

It will be appreciated that it is important to the successful practice of the invention that the nipple 120*c* be precisely centered in the exit aperture 108, so that the metal core of the microwire thus formed is evenly sheathed by the resin forming the insulation. Likewise, it is important to the optimization of the process parameters that the relative axial positions of the orifice extension 120*c* and the exit aperture 108 be readily and repeatedly adjustable. FIG. 8 shows schematically one mechanical arrangement for accomplishing these objectives.

More specifically, in FIG. 8 centering of the inner crucible 102 is accomplished by providing three or more centering fins 130, 132 around the upper and lower portions of the inner crucible. The fins 130, 132 are sized so as to fit well within the outer crucible 104, as illustrated. Conveniently, fins 130, 132 may be welded to collars 134, 136 respectively, within which the inner crucible fits snugly. Vertical adjustment of the position of orifice extension 120*c* with respect to the exit aperture can be accomplished by longitudinally securing the assembly of the upper fins with respect to the outer crucible 104—e.g., by notching fins 132 so that they fit over the edge of the upper opening in outer crucible 104, as shown—and providing a collar 140 that is threaded to the inner crucible 102 and bears on the upper collar 136, as illustrated, such that vertical adjustment can be made simply and repeatably by turning collar 140 in one direction or the other. Numerous comparable means for adjusting the relative positions of inner and outer crucibles are within the skill of the art.

Thus, as discussed above, a fiber 142 comprising a metal core 144 in a polymer resin sheath 146 can be formed in a single operation by codrawing the materials from their respective orifices, as illustrated. The fiber 142 is then drawn down to a final diameter by passing it over a sheave 148, its tension being controlled by a Godet roller assembly, as indicated schematically at 150 and can be spooled, after suitable inspection steps and the like, as discussed above in connection with FIG. 7. Postprocessing, as generally indicated at 152, is also within the scope of the invention. For example, the fiber can be reheated after initial formation, typically by passing it through a tubular oven 154, so as to be annealed, and/or in order to be drawn down further, perhaps using another Godet multi-roller mechanism 166 to apply controlled tension, followed by spooling at 168.

In addition to the materials discussed, additional resins have been tried since the filing of the parent application, these including LWA Nylon 208, processed at 430-460° F., and found suitable to make a sheath 1-2 mils thick; Halar 650, which is an ethylene-chlorotrifluoroethylene made by Solvay Chemicals, processed at 485-515° F., and found suitable to make a sheath 5 mils thick; and TE 9494 (DuPont) processed at 630-675° F. The optimal sheath thickness for the TE 9494 material has not yet been determined. Further, it appears that a nylon variation sold as Grilamid L20 GHS, processed at 460-510° F. will be preferred over LWA Nylon 208 (both sold by EMS Grilamid, of South Carolina) as the latter includes a heat stabilizer and is unduly costly. Fluouropolymers have also been successfully tested; Solvay 6008 and 11008 processed around 475-550° F., and Dupont FEP 100 and Dupont PFA 340 around 635-690° F.

It is to be noted that the temperatures referred to in the above are those of the band heater, as measured by a flat thermocouple sandwiched between the crucible and the band heater. The band heater temperature is believed to be about 30-50° F. higher than the temperature at the center of the polymer bath; the polymer temperature can also vary somewhat from place to place.

A further method of making connections to the microwires of the invention has also been successfully tested. A quantity of a suitable metal, such as indium or gold, is melted in a suitable crucible. The end of the microwire, with the polymer sheath in place, is then dipped in the molten metal, so as to be coated with the molten metal. The end of the microwire can then be passed through a suitable die to remove excess molten metal. This results in a thin metal cup-shaped cap over the end of the microwire, with the metallic core in contact with the center of the cap and the sides of the cap extending over the polymer sheath at the end of the wire. The relatively larger diameter of the cap makes it comparatively straightforward to attach conductors connecting the core of the microwire to associated circuitry, as desired. Additional useful possibilities to be tried include exposing the tip of the fiber to a corona charge-prior to metal coating as above, and application of a conductive coupling agent and use of a conductive paint or organic compound to similarly provide a conductive tip on the fiber.

As of the filing of this continuation-in-part application, the following appear to be the optimal process parameters for successfully making microwires according to the invention:

The double crucible method is used, employing the tip and cap design shown in FIG. 8 and discussed in detail above, that is, with a exit aperture of 0.055" in the inner crucible 102 and 0.400" in the cap 106. Both metal and resin are melted in their respective crucibles, and only gravity is used to force the molten materials into their respective orifices. In particular, it is found important to add pellets of the metal to the inner crucible one at a time, as metal is withdrawn, so as not to exert undue pressure on the column of molten metal exiting the orifice extension 120*c*. An automatic feeder is employed for consistency. The weights of the typical pellets as supplied vary somewhat. Typically about 3-5 grams of metal are melted in the inner crucible at any given time.

The tip of the orifice extension 120*c* should protrude beyond the cap 106 of the outer crucible (dimension F in FIG. 8) by 0.05".

The preferred resins are those known as Provista and 6763, which are both members of the PETG family. Provista has a heat stabilizer, while 6763 is the most transparent of this family of resins. If Provista is used, the temperature thereof should be 505° F. If 6763 is used, the preferred temperature range is 440-480° F. The fiber can be taken up at a speed of 300-375 feet per minute. In each case the polymer should be thoroughly dried prior to use to eliminate humidity. Typical drying conditions for PETG polymer pellets are 6 hours at 175° F. It is understood that Provista is to be phased out by its manufacturer in favor of an improved version called Provista NXT, which should also be suitable for practice of the invention.

As to the preferred metal, as discussed above early work was done using Indium 290 (97% Indium/3% silver), due to its low melting temperature (290° F.) and high conductivity (23% of copper). Heat from the polymer bath was used to melt the metal. Recently, successful tests have been performed using Indium 4 (pure indium, melts at 314.5° F. with 1% additional increase in conductivity). Indium 290 and Indium 4 both cost the same ($650/lb). Indium 290 is preferred unless more heat tolerant metal is required.

Indium 1E (52% indium, 48% tin) was also tried because it melts at even lower temperatures (244° F.), cost $545/lb. Other than the low melting temperature, Indium 1E does not provide significant advantages; its conductivity is only 16% of Cu, and the price advantage is minimal.

Indium 121 was also tried, with less-demanding civilian applications in mind. The biggest advantage is the price ($27/lb vs $660/lb). Indium 121 has enough conductivity for most civilian applications (16% of copper). However, Indium 121 melts at 430° F., which makes it difficult to use the heat of the polymer bath to melt the metal. However, tests were successfully run at 200 fpm using Indium 121 heated by heat applied to an outer crucible containing macrolon 3103 polycarbonate heated to 560° F. An inner crucible heating arrangement, perhaps a heated metal block disposed around the inner crucible, allowing the metal to be melted independent of the heat from the polymer bath, might usefully be tried so as to allow independent heating of metal and polymer and thus more freedom of choice. Indium 128 (pure tin, melts at 450° F., conductivity 15.6% of Cu, cost $20/lb) may also be a viable choice.

Thus, the preferred metals are Indium 290 and Indium 4 for the military market, and Indium 121 for the civilian market.

It has also been noted that the flow properties of the molten metals (or reduction of metal oxidation) can be improved by purging the oxygen from above the molten metal, e.g. by filling this space with a 88% nitrogen, 12% hydrogen mixture; the hydrogen combines with any oxygen present to form water vapor that can be conveniently purged. An inert gas may also be useful, both to avoid oxidation and to apply pressure to the molten metal to affect flow.

Those of skill in the art will recognize that numerous additions and improvements can be made to the method of the invention, and to the products produced thereby, without departure from its essential spirit and scope.

In particular, it is within the scope of the invention to improve on the double-crucible method of the invention by providing two or more inner crucibles in a single outer crucible, or to provide a single inner crucible with two or more nipples, such that plural conductors can be formed simultaneously in a single insulated sheath. For similar purposes, as mentioned above, plural rods can be disposed in a single polymer member and codrawn according to the rod-in-tube method.

It is also within the scope of the invention to provide different polymers in order to provide a fiber made up of plural polymers having different mechanical, electrical, or chemical characteristics as desired. For example, in practice of the rod-in-tube method, a number of metal rods could first be disposed in bores in a cylindrical member of a first polymer, chosen, e.g., for its processing characteristics. This precursor could then be disposed in a tubular member of a polymer having desired engineering properties, e.g., fire retardant, abrasion resistant, or chemical resistant properties, retroreflectivity, hydrophobicity, desired optical or magnetic properties, and/or piezoelectric behavior, and the whole codrawn to achieve a fiber having the desired characteristics. Alternatively, the microwire as initially made could be provided with a further sheath of polymer exhibiting these or other desired engineering characteristics, or the polymer surrounding the conductor if the microwire could likewise be selected or modified to have such desired characterisitics.

More specifically, it is likewise within the scope of the invention to add dopants or additives to the polymer used in the double-crucible method to alter its properties in a desired way; for example, if at least two conductors are provided, a quantity of electroluminescent phosphor can be added to provide a fiber that will emit visible light if an electric field is impressed across the conductors (this last possibility being the subject of copending Ser. No. 12/292,404 filed Nov. 18, 2008). The fiber can also be coated after manufacture to impart desired properties, e.g., coated with a hydrophobic material.

Accordingly, while several preferred and alternative embodiments of the invention have been disclosed in detail, the invention should not be limited thereby, but only by the following claims.

What is claimed is:

1. Apparatus for formation of an insulated microwire comprising a conductive metallic central filament within an insulative polymer resin sheath, comprising:

generally tubular elongated inner and outer crucibles, for receiving said metal and resin respectively, devices for heating the metal and polymer resin in said crucibles to respective desired temperatures, said inner and outer crucibles being mounted vertically with said inner crucible being mounted within said outer crucible, said outer crucible having a resin inlet opening at its upper end and a cylindrical resin discharge passage at its lower end, wherein the lower end of the outer crucible defines a frustoconical inner surface, having the cylindrical resin discharge passage disposed at the lowest central portion thereof, said cylindrical resin discharge passage terminating at a resin discharge aperture, wherein said generally tubular elongate inner crucible comprises a upper body and a tip affixed to the lower end of the upper body, said upper body having a metal inlet opening at its upper end, wherein said tip defines an outer surface and an inner surface, the outer surface thereof comprising a upper portion of a first larger diameter conforming generally to the outer diameter of said upper body portion of said inner crucible, an intermediate portion, and a elongated lower nipple of a second smaller diameter having a metal discharge aperture therein, an adjustment device for controllably varying the relative axial positions of the inner and outer crucibles, and wherein the length of the elongated lower nipple is longer than the cylindrical resin discharge passage, so that the relative axial positions of said inner and outer crucibles can be adjusted, so as to define the relative location of the resin discharge aperture of the outer crucible with respect to the metal discharge aperture in the lower end of said nipple, without variation in the cross-sectional area of the resin flow passage formed therebetween, whereby a fiber comprising a central filament of said metal surrounded by a sheath of said resin can be drawn from the lower apertures of said inner and outer crucibles.

2. The apparatus of claim 1, further comprising a takeup reel for winding a microwire comprising a metallic filament in a polymer resin sheath, such that said fiber is drawn down from an initial diameter to a final diameter, whereby the relative rate of takeup of said microwire with respect to the rate of discharge of said fiber determines the diameter of said microwire.

3. The apparatus of claim 2, comprising a further heating device for applying further heat to the fiber after it has been drawn from the lower apertures of said inner and outer crucibles so as to enable the fiber to be drawn down further.

4. The apparatus of claim 3, wherein the further heat is applied to the fiber and it is further drawn down after initial drawing and spooling steps have been performed.

5. The apparatus of claim 1, wherein said intermediate portion of the outer surface of said tip comprises an elongated portion of generally constant diameter, and comprises smoothly-curved sections connecting the upper end of said elongated portion to the upper portion of the outside surface of said tip and the lower end of said elongated portion to said nipple, respectively.

6. The apparatus of claim 5, wherein the inner surface of said inner crucible conforms generally to the outer surface thereof.

7. The apparatus of claim 1, further comprising an automated device for inspecting the fiber as it is drawn.

8. The apparatus of claim 7, further comprising an automated device, responsive to said automated device for inspecting the fiber as it is drawn, for controlling the level of metal in said inner crucible.

9. The apparatus of claim 1, further comprising an automated device for monitoring and controlling the level of metal in said inner crucible.

10. The apparatus of claim 1, further comprising a heater for maintaining the temperature of the metal in said inner crucible and of the resin in the outer crucible at predetermined levels.

11. The apparatus of claim 1, wherein at least the inner surface of said inner crucible is coated with a material chosen to improve the flowing characteristics of the metal.

12. The apparatus of claim 11, wherein said material is chosen from the group consisting of nickel and polytetraflouoroethylene.

13. The apparatus of claim 11, wherein the material of said inner crucible is stainless steel and a nickel coating is applied by electroless plating.

14. The apparatus of claim 1, further comprising apparatus for supply of a non-oxidizing gas to the inner crucible above the level of metal therein.

* * * * *